April 26, 1955

J. A. GAVIN 2,707,267

FAULT LOCATER

Filed May 6, 1949

INVENTOR.
John A. Gavin
BY
his Attorney

INVENTOR.
John A. Gavin
BY Ezekiel Wolf
his Attorney

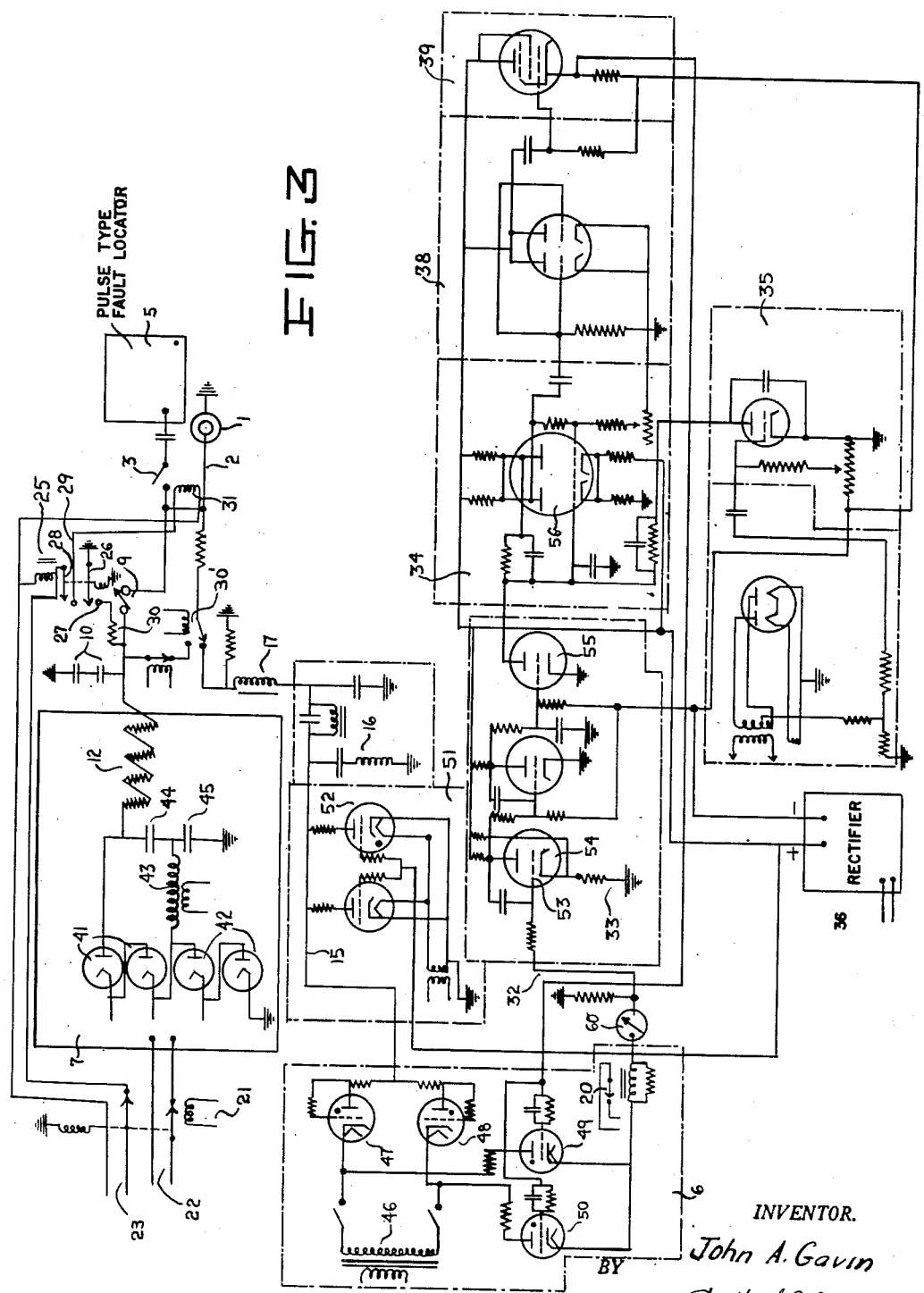

United States Patent Office 2,707,267
Patented Apr. 26, 1955

2,707,267

FAULT LOCATER

John A. Gavin, Attleboro, Mass., assignor to Tobe Deutschmann Corporation, Norwood, Mass., a corporation of Delaware Application May 6, 1949, Serial No. 91,717

8 Claims. (Cl. 324—52)

The present invention relates to an electrical fault locator of the type which has been described in the co-pending application of Andre J. Devet, filed January 7, 1948, Serial No. 997, now Patent No. 2,651,752, in the United States Patent Office.

It has been found that in fault locators of this type, more fault measurements can be made providing a definite known type of fault can be effected. A difficult type of fault to locate is one in which the fault disappears under certain test conditions which obviously gives indeterminate results.

By the improved procedure in the present case, the fault is maintained in a state which may be detected by establishing and continuing an arc across the fault which may readily be detected by the methods employed in the present invention. Several difficulties present themselves in making measurements under conditions where current is maintained in the line test. One of these difficulties arises from the fact that the delicate test apparatus must be connected with the line directly or indirectly so that it is subject to the voltage and current variations that are usually impressed upon the line under test. Another difficulty arises from the fact that usually a different potential is necessary to start a breakdown arc because ionization must be established from that necessary to continue the arc after it has once been established. For this reason a high potential arc with high power behind it, would for the most part be dangerous because after the arc had once commenced, a great deal more power would be drawn at the point of arcing and considerably more damage might be done than originally caused through the fault. If the power were not sufficient to supply the current drawn, the voltage might drop so low that the arc would become extinguished and further measurements may be made difficult.

It has been found that by commencing the arc with high voltage and low current and switching, once an arc had been commenced to a source of lower voltage, but greater and constant current capacity, that an arc could be continued across a resistive fault for a long enough time permitting complete measurements and tests to be made with little or no damage to the lines or cables and provide conditions under which accurate location of the fault could be made.

The present invention has been found exceedingly practical and accomplished results in practically all of the conditions of resistive and shorted faults that usually exist in power cable supply lines. Open faults do not present difficulties so that therefore the apparatus of the present invention has found great practical utility for power line fault location in general.

The present invention not only provides a quick means of locating faults, but also is a labor-saving device and therefore serves a further economy. Particularly in buried cables where the ground must be opened at the point of fault, the accuracy provided by the present invention enables the operator to come very closely to the exact spot where the fault is located. This results in both saving of time and labor, rendering the public great utility in being able to effect quick repairs.

The present invention will be more fully described in the specification below when taken in connection with the drawings illustrating an embodiment of the same, in which:

Figure 3 shows a complete circuit diagram.

Figure 1:
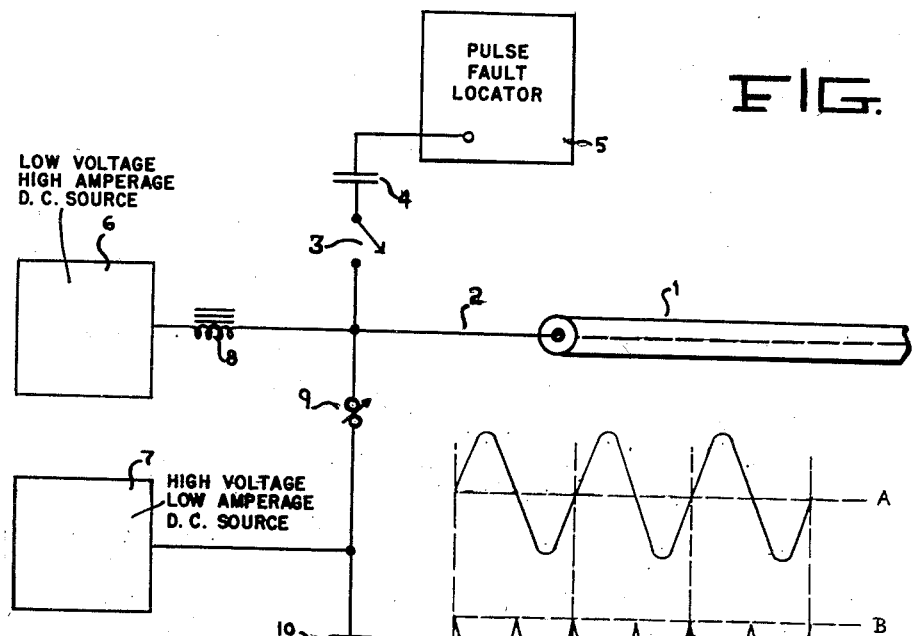
Figure 1 shows a brief schematic diagram of the circuit of the present invention.

As indicated in Figure 1, a line or cable 1 is under test. The conductor 2 of the cable is connected through an isolating relay switch 3 and a blocking condenser 4 to a pulse type fault locator 5. Two power sources are provided in the system, the power source 6 being a low voltage high amperage direct current and the power source 7 being high voltage low amperage direct current. These both are connected to the cable 1, the power source 6 through a swinging or large choke 8 and the power source 7 through an adjustable ball gap 9 which is in series with a charging condenser 10 connected between the power supply source 7 on the one side and ground 11 on the other side.

In the operation of the system as set forth in Figure 1, the high voltage low amperage direct current circuit 7 is energized by means of which a condenser 10 is charged, thereby impressing the high voltage through the adjustment ball gap 9 between the conductor 2 of the cable and ground.

As will be noted in a further description of the invention when the fault is ionized and the arc begins, then the high voltage source is disconnected and the low voltage high amperage source connected to provide the voltage and current to continue the arc at the fault in the cable. The high power may have a voltage of 50,000 volts with a capacity of 10 milliamperes, while the lower voltage source may operate at 1000 volts and 10 amperes capacity.

When the lower voltage source has been applied, then the isolating relay switch 3 is closed and the pulse fault locator 5 is connected to the line for locating and making a measurement to the fault.

The pulse type fault locator 5 may be of the same design and construction as described in the copending application of Andre J. Devet mentioned above in which a pulse of short time duration in micro-seconds is sent down the line and the time it takes from reflection from the fault to return is measured on a cathode ray oscilloscope tube.

Figure 2:
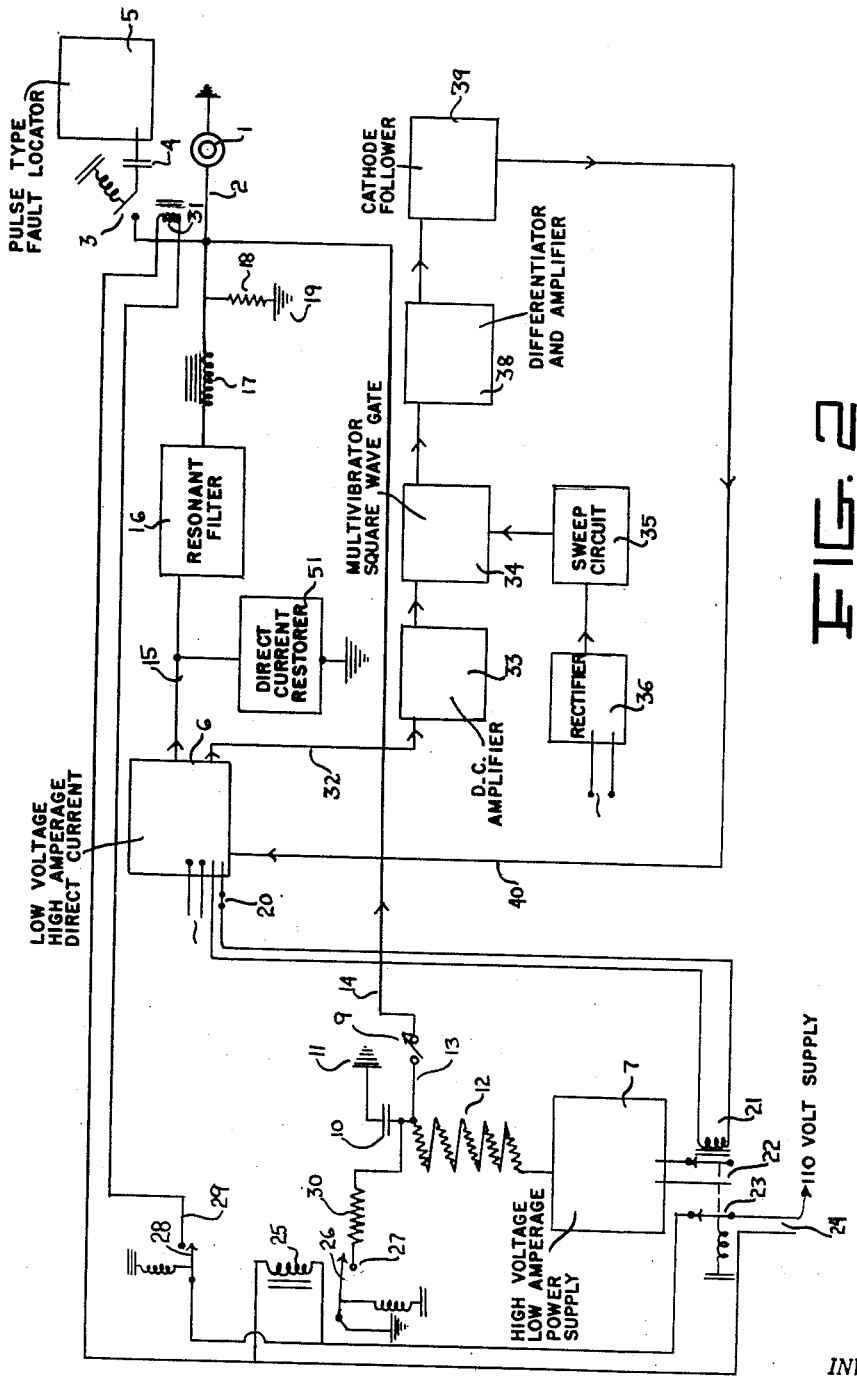
Figure 2 shows a more elaborate detailed circuit diagram of the present invention preserving in general the block form of elements.

The arrangement indicated in Figure 2 shows in block diagram, the details of control by means of which the low voltage high amperage direct current power source is provided for the purpose of maintaining a constant current arc in the fault and also the system of operating control for impressing the power on the cable.

In the diagram of Figure 2, the high voltage, low amperage power supply 7 is connected through a high resistance 12 to the charging condenser 10 and ground 11. From the end of the resistance 12 which connects the one side of the condenser 10, a connection 13 is made to the adjustable ball gap 9 the other side of which is connected by the line 14 to the conductor 2 of the cable 1. When the arc has been established at the fault, the low voltage high amperage rectifier 6 begins to supply current over the line 15 through the resonant filter 16 and the isolating choke 17, which prevents the high voltage from coming back to the low voltage source, to the conductor 2 of the cable 1. A leak to ground is provided by the resistance 18 and the ground 19 from the conductor side of the isolating choke. As current is supplied by the low voltage source, the current relay 20 operates to energize the relay 21 and thereupon breaks the supply 22 to the high voltage source thus shutting off the high voltage power. At the same time the switch arm 23 is opened over the 110 volt supply 24 so that the relay coil 25 becomes de-energized thus permitting the closing of the circuit between the switch 26 and the point 27 and the switch 28 and the point 29. Closing the circuit between the switch 26 and the point 27 discharged the condenser 10 to ground through the resistance 30 while closing the contact between the switch 28 and the point 29 energizing the isolation relay coil 31 for the switch 3, thus closing the circuit to the pulse type fault locator 5 whose function and operation has been described by reference to the companion application herein mentioned. The purpose of the relay 30' is to cut out the ball gap 9 and at the same time disconnect the low voltage source.

In the further elements of the system indicated in Figure 2, the low voltage, high amperage rectifier is connected by the line 32 to a direct current amplifier 33 which in turn is connected to a control multi-vibrator 34 to produce a square wave negative gate. This is accomplished in combination with a sweep circuit 35 controlled by a line voltage synchronized rectifier 36 the output of which is impressed upon the sweep circuit 35 with the result that a saw tooth wave form is obtained in the output of the sweep circuit of double the frequency of the line voltage source. If the ordinary 110 volt line at 60 cycles is used, then the sweep cycle would have 120 cycles. This output is impressed over the connection 37 to the controlled multi-vibrator 34 to produce in the output thereof a negative square top wave in which one complete cycle corresponds to one cycle of the sweep circuit. This square top wave is impressed on the differentiator and amplifier 38 for the production of individual pulses which in one period of the circuit are both positive and negative, but which in the output are limited to substantially positive pulses.

The output of the differentiator and amplifier are impressed upon the cathode follower 39 which acts as a power matching stage used for a control of the current in the low voltage high amperage rectifier 6. The cathode follower providing such a trigger output is connected over the line 40 to the low voltage high amperage rectifier 6.

The description of Figure 2 makes it easier to understand the wiring diagram of Figure 3. The block section 7 comprises the high amperage, low voltage power source which may be of any desired form, but is shown in the block 7 made up of two pair of rectifier tubes 41 and 42 connected in series and energized by a step up transformer 43 which is connected to a point between the pair of tubes on the one and between condensers 44 and 45 on the other side. The condenser 45 is connected on the other side to ground and both condensers are practically constantly charged and act in series for doubling the voltage through the resistance 12 to charge up the condensers 10, which when charged, discharge through the adjustable gap 9 and the conductor 2 across the line 1 to ground at the fault in the line. By adjustment of the length of the gap the voltage produced at the fault can be increased or decreased as desired.

Figure 4:
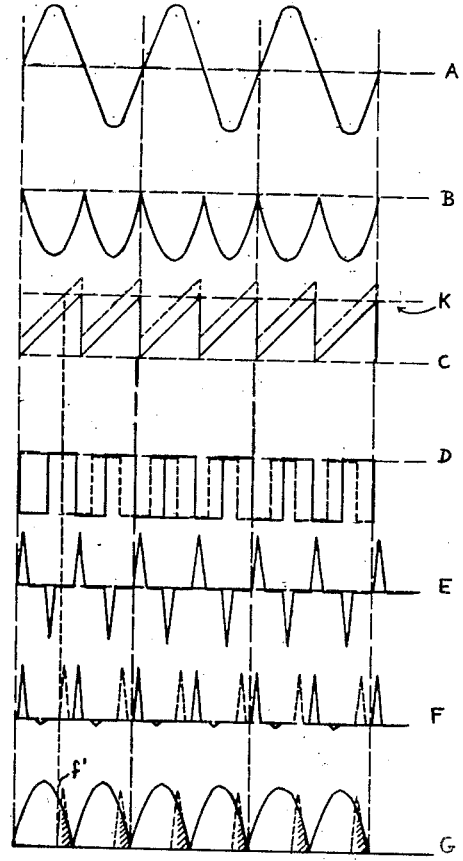
Figure 4 shows a set of curves produced in the circuit of Figure 3.

For the low voltage high amperage rectifier, the rectifier 6 may comprise pairs of full wave gaseous rectifier in a bridge circuit operated at a high voltage through the step-up transformer 46. These rectifier tubes 47, 48, 49 and 50 provide a full wave rectification of the type indicated by curbe $b$, Figure 4, which shows full wave negative rectified pulses conducting through each half cycle. The pulses may be considered negative or positive depending upon the reference point from which the positive or negative is judged. The rectified direct current, the output of which may be of the order of 1000 volts, is conducted over the line 15 through the resonant filter 16 and the isolating choke 17 to the conductor 2 of the cable as has been previously explained. The direct current restorer indicated by the block 51, Figure 2, is connected between the line 15 and ground. The purpose of this restorer is to cut off positive reflections from the filter so that the functioning of the rectifier 6 will go on smoothly regardless of the pulses passed or reflected back from the cable or the filter. The discharge tubes 52 of the restorer pass the pulses to ground which are reflected through or from the filter. In order to maintain the rectified current impressed by the rectifier 6 on the cable at a given desired amperage so that the arc will hold constant, a self equalizing or controlling system is employed which brings about a more complete or less complete discharge of the rectifier tubes 47, 48, 49 and 50 as may be required to maintain the current supply constant.

For this purpose, the direct current amplifier 33 is operatively connected to the output of the rectifier through lead 32 to the grid 53 of the input tube 54 of the direct current amplifier. The output of this direct current amplifier which is in the plate circuit of the tube 55 connects to the input of a multi-vibrator circuit 34 where in combination with a saw tooth wave, the output provides a square top wave as indicated by the full line curve $d$ of Figure 4. The multi-vibrator 34 which may be of the Eccles-Jordan type has its input grid 56 excited by a constant saw tooth sweep circuit 35 in addition to the varying direct current component mentioned supplied through the output of the D. C. amplifier. This direct current component is indicated in the curve $c$ of Figure 4 by the dotted line $k$, which has the effect of shifting the saw tooth pulses either up or down and thereby shifting the square topped waves of the output of the multi-vibrator to the left or right. The differentiator and amplifier 38 above mentioned produces the peaked pulses $e$ in Figure 4; and the cathode follower trigger output 39, the series of trigger pulses both in positions dependent upon the shift brought about by the effect of the positive potential impressed upon the grids 56 of the multi-vibrator.

A positive change in the input of the D. C. amplifier produces a large negative change in the output of the D. C. amplifier and the negative change thus impressed on the multi-vibrator produces a shift of the square topped negative pulses to the right producing what may be called a smaller gate interval, that is a smaller time interval for the rectifier tubes to operate before they extinguish at the end of each half cycle as indicated in curve $g$ of Figure 4, where when peaks $f'$ corresponding to $f$ are shifted to the right, the operation of the rectifiers or firing of the gaseous conduction tube in the rectifier 6 occur at a later time in the cycle. It will be seen therefore that as the average current is increased up in the rectifier 6, a counter effect is established through the various circuits described to reduce the portion of the cycle during which the discharge takes place. This has the effect of reducing the current and if therefore the current is set at a normal operating value as indicated in the meter 60, it may be maintained at such a value.

When, therefore, in the operation of the system, the high voltage has ionized the fault to establish an arc, the low voltage supply will take over to keep the arc at the desired value and at the same time the circuit will be closed to pulse fault finder to produce visual measurements of the position of the fault on the cathode ray tube indicator. Small variations in current at the arc are helpful to fill in the "pips" which indicate the faults on the cathode ray tubes. Other points of reflection on the line, having a constant impedance as compared with the varying impedance of the arc fault will show as a sharp line on the cathode ray tube and this provides a means of distinguishing between the fault and other points of reflection on this line.

Having now described my invention, I claim:

1. In a fault locator of the type described for establishing the presence and location of a resistive fault, wherein an electric pulse of extremely short duration is transmitted over a line to be tested and the time of travel of the pulse to a fault on the line and the return of its reflected pulse to the point of transmission is measured, a source of high potential and low amperage first applied to said line for ionizing said resistive fault, a source of lower potential and constant current of a chosen magnitude subsequently applied for maintaining the ionization of said fault and, means for impressing first one and then the other source on the line.

2. In a fault locator of the type described for establishing the presence and location of a resistive fault, wherein an electric pulse of extremely short duration is transmitted over a line to be tested and the time of travel of the pulse to a fault on the line and the return of its reflected pulse to the point of transmission is measured, a source of high potential and low amperage first applied to said line for ionizing said resistive fault, a source of lower potential and constant current of a chosen magnitude subsequently applied for maintaining the ionization of said fault and, means for impressing first one and then the other source on the line, prior to the application of a pulse type fault locator to the line and said pulse type fault locator.

3. In a fault locator of the type described for establishing the presence and location of a resistive fault, wherein an electric pulse of extremely short duration is transmitted over a line to be tested and the time of travel of the pulse to a fault on the line and the return of its reflected pulse to the point of transmission is measured, a source of high potential and low amperage first applied to said line for ionizing said resistive fault, a source of lower potential and constant current of a chosen magnitude subsequently applied for maintaining the ionization of said fault and, means for automatically impressing first the high potential source and then the low potential source as the high potential source is disconnected from the line.

4. In a fault locator of the type described for establishing the presence and location of a resistive fault, wherein an electric pulse of extremely short duration is transmitted over a line to be tested and the time of travel of the pulse to a fault on the line and the return of its reflected pulse to the point of transmission is measured, a source of high potential and low amperage first applied to said line for ionizing said resistive fault, a source of lower potential and constant current of a chosen magnitude subsequently applied for maintaining the ionization of said fault and, means for automatically impressing first the high potential source and then the low potential source and pulse type fault locator on the line as the high potential source is disconnected from the line and said pulse type fault locator.

5. In a fault locator of the type described for establishing the presence and location of a resistive fault, wherein an electric pulse of extremely short duration is transmitted over a line to be tested and the time of travel of the pulse to a fault on the line and the return of its reflected pulse to the point of transmission is measured, a source of low amperage and high potential of sufficient magnitude for ionizing a resistive fault on the line, a source of lower potential adapted to be applied to the line after the fault has been ionized, means for connecting the sources of potential to the line to be tested and for disconnecting the high potential before said low potential source and pulse fault locator is applied to the line and means for maintaining the current of said lower potential source at a value sufficient to maintain an arc at the fault, and said pulse fault locator applied to said line for measuring the distance from one end of the line to the fault by the time interval of travel of the pulse from said end of the line to the fault and return while said arc is maintained.

6. In a fault locator of the type described for establishing the presence and location of a resistive fault, wherein an electric pulse of extremely short duration is transmitted over a line to be tested and the time of travel of the pulse to a fault on the line and the return of its reflected pulse to the point of transmission is measured, a source of low amperage and high potential of sufficient magnitude for ionizing a resistive fault on the line, a source of lower potential adapted to be applied to the line after the fault has been ionized means for connecting said sources of potential to said line, said source of lower potential comprising full wave grid controlled gaseous rectifier means operated from an alternating current source connected to said line and means for maintaining the current output of said rectifier means at a value sufficient to maintain an arc at the fault comprising means for producing a series of spaced pulses synchronized with the alternating current source, means controlled by the output of the rectifier source for varying the phase of the pulses with respect to the alternating source and means for applying said pulses so varied to said grids to control the operation of said rectifier means whereby the current is maintained constant.

7. A device as set forth in claim 6 including a multivibrator having the output of said rectifier impressed upon it, oscillator means providing a saw tooth wave, means for impressing said saw tooth wave impressed upon said multivibrator for controlling the phase positions of a series of pulses produced thereby synchronized with the rectified wave, whereby the current is maintained constant.

8. In a fault locator of the type described for establishing the presence and location of a resistive fault, wherein an electric pulse of extremely short duration is transmitted over a line to be tested and the time of travel of the pulse to a fault on the line and the return of its reflected pulse to the point of transmission is measured, a source of low amperage and high potential of sufficient magnitude for ionizing a resistive fault on the line, a source of lower potential adapted to be applied to the line after the fault has been ionized, means for connecting said sources of potential to said line and means for maintaining the current of said lower potential source at a value sufficient to maintain an arc at the fault, including means operated by the output current value to control the magnitude of the input current.

References Cited in the file of this patent

UNITED STATES PATENTS

| Number | Name | Date |
|---|---|---|
| 689,253 | Varley | Dec. 17, 1901 |
| 689,254 | Varley | Dec. 17, 1901 |
| 1,688,038 | Curtis | Oct. 16, 1928 |
| 2,065,662 | Viney | Dec. 29, 1936 |
| 2,345,932 | Gould | Apr. 4, 1944 |
| 2,460,688 | Gambrill et al. | Feb. 1, 1949 |
| 2,493,800 | Biskeborn | Jan. 10, 1950 |